UNITED STATES PATENT OFFICE.

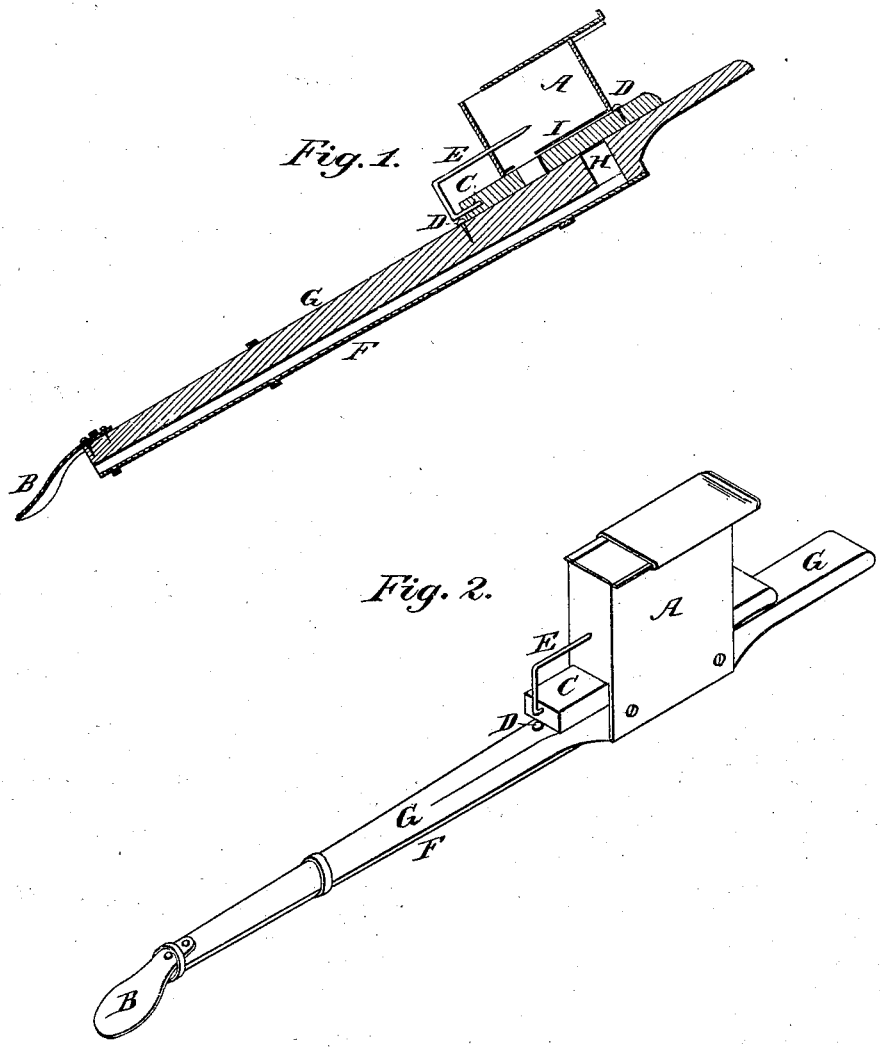

GEORGE W. DOTY, OF LANCASTER, OHIO.

IMPROVEMENT IN CORN-PLANTERS AND SPADES.

Specification forming part of Letters Patent No. 152,471, dated June 30, 1874; application filed April 28, 1874.

*To all whom it may concern:*

Be it known that I, GEORGE W. DOTY, of Lancaster, county of Fairfield, State of Ohio, have invented a new and useful Improvement in a Combined Corn-Planter and Spade, of which the following is a specification:

Figure 1 is a vertical section. Fig. 2 is a perspective view of the instrument as relates to a hand corn-planter, so constructed as to be convertible into a spade, and thereby facilitating the operator in preparing the ground suitable for dropping and covering the corn or other seeds.

A represents the seed-box, attached to the handle G and conducting-pipe F by two screws on each side, and so constructed as to be taken off when used as a spade and not for dropping corn or other seeds. B represents the spade whereby the ground is raised to admit the corn to be dropped just underneath the spade, so when the spade is withdrawn the ground will fall back upon and cover the corn or other seeds. C represents the dropper-slide, so constructed that, as the spade is shoved in the ground, the slide is shoved under the hole in the bottom of the seed-box, as shown in Fig. 1, by a natural downward movement of the hand, when held by the upper end of the handle, and receives the corn or seeds; then the slide is drawn back with the thumb and finger, and drops the corn or seed into the spout through the hole H, which conveys it down under the spade. I represents a spring in the bottom of the seed-box A, whereby the seed may pass under and out of the box, and not clog as the dropper-slide C is drawn. D D represent pins or screws, whereby the dropper-slide is regulated to receive more or less corn or seed, as the case may need. E represents a wire, so constructed as to agitate and prevent the corn clogging as the dropper-slide is moved to receive the seeds. F represents a conducting pipe or spout, made of any material, so constructed as to convey the corn down under the spade.

I claim as my improvement—

The combination of the seed-box A and spring I with the adjustable dropper-slide C and regulating pins or screws D D and wire E, constructed as described, to be easily removed from off the handle G and spout F, thereby converting the implement into a spade, suitable for light work, the whole being constructed and arranged to operate in the manner and for the purpose specified.

GEORGE W. DOTY.

Witnesses:
W. A. HALE,
CHAS. R. DRINKLE.